United States Patent
Jore et al.

(10) Patent No.: US 8,719,353 B2
(45) Date of Patent: May 6, 2014

(54) SYSTEMS AND METHODS FOR VISUAL MESSAGING

(75) Inventors: Park Jore, Kula, HI (US); Wylci Fables, Kula, HI (US); Jonathan Colt, Portland, OR (US)

(73) Assignee: SeaSeer Research and Development LLC, Kula, HI (US)

( * ) Notice: Subject to any disclaimer, the term of this patent is extended or adjusted under 35 U.S.C. 154(b) by 319 days.

(21) Appl. No.: 12/807,115

(22) Filed: Aug. 27, 2010

(65) Prior Publication Data

US 2011/0055336 A1    Mar. 3, 2011

Related U.S. Application Data

(60) Provisional application No. 61/238,747, filed on Sep. 1, 2009.

(51) Int. Cl.
*G06F 15/16* (2006.01)

(52) U.S. Cl.
USPC .......................................................... 709/206

(58) Field of Classification Search
USPC ........................................ 709/206; 707/769
See application file for complete search history.

(56) References Cited

U.S. PATENT DOCUMENTS

| | | | |
|---|---|---|---|
| 6,282,697 B1 | 8/2001 | Fables | |
| 6,895,406 B2 | 5/2005 | Fables | |
| 7,127,701 B2 | 10/2006 | Fables | |
| 7,263,474 B2 | 8/2007 | Fables | |
| 7,630,874 B2 | 12/2009 | Fables | |
| 2004/0097195 A1 | 5/2004 | Selleck | |
| 2006/0019636 A1 | 1/2006 | Guglielmi et al. | |
| 2006/0148528 A1* | 7/2006 | Jung et al. | 455/566 |
| 2008/0182566 A1 | 7/2008 | Camp, Jr. | |
| 2008/0268882 A1 | 10/2008 | Moloney | |
| 2009/0210508 A1 | 8/2009 | Toni | |
| 2010/0287196 A1* | 11/2010 | Shields et al. | 707/769 |

OTHER PUBLICATIONS

ISR, Oct. 27, 2011.

* cited by examiner

*Primary Examiner* — Adnan Mirza
(74) *Attorney, Agent, or Firm* — John S. Paniaguas; Katten Muchin Rosenman LLP

(57) ABSTRACT

A system and method is disclosed for receiving user input data, such as voice data and text data, associating a visualization with the user input data; and creating an MMS message based upon the visualization. Optionally, the system is configured to analyze and process such user input data to generate linguistic, semantic, cultural or other contextual data for association with multimedia files. By using tagging and indexing, user input data is processed to generate one or more associations with visualizations. A processor or engine searches a database to find associated visualizations or multimedia files that match the user input data. The multimedia files may then be concatenated or streamed to communicate one or more series of multimedia files in lieu of the text data. Accordingly, users can transform textual and voice communication into a multimedia-rich means of communication with one another.

34 Claims, 9 Drawing Sheets

SYSTEMS AND METHODS FOR VISUAL MESSAGING

COMPUTER APPENDIX

This application includes a Computer Listing Appendix on compact disc, hereby incorporated by reference.

CROSS REFERENCE TO RELATED APPLICATIONS

This application claims priority to and the benefit of U.S. Patent Application No. 61/238,747, filed on Sep. 1, 2009.

BACKGROUND OF THE INVENTION

1. Technical Field

The present invention relates to machine based techniques for receiving user text and voice inputs and transforming those inputs into visualizations that are based on the inputs in order to create multimedia messages based on the inputs which optionally analyze the inputs in order to take into account linguistic, semantic, and cultural differences in the user inputs to provide enhanced clarity of meaning when creating the visualizations.

2. Description of the Prior Art

Text-based communication, such as email, Short Message Service (SMS), Multimedia Messaging Service (MMS) and other messaging platforms, such as voice mail, have been widely used by individuals and organizations to communicate with one another. While electronic text-based communication has incorporated images, such as avatars and/or emoticons, to supplement text messaging, there has not been an effective platform for users to supplement or replace text with multimedia content as a primary means of communication.

Platforms such as MMS messaging encode multimedia content and inserts the content into a text message in a fashion similar to sending a MIME e-mail. MMS defines a subset of MIME content formats in the MMS Message Encapsulation specification. Messages are forwarded to the carrier's MMS store and forward server, also known as the "MMS relay". If the receiver is on another carrier, the relay forwards the message to the recipient's carrier using the Internet. Once the content reaches the correct MMS relay for the receiver, the content is extracted and sent to a temporary storage server with an HTTP front-end. An SMS "control message" containing the URL of the content is then sent to the recipient's handset to trigger the receiver's WAP browser to open and receive the content from the embedded URL.

Emoticons are commonly used in web forums, instant messengers and online games, where text emoticons (e.g., ":-)") can be automatically replaced with small corresponding images. Recently, emoticons have expanded beyond simple cartoon facial expressions to a variety of still or moving images. Further, some instant messaging software is designed to play a sound upon receiving certain emoticons. Many platforms use GIF or PNG graphic files, because of their transparency and small file size capabilities. Files can be created using a raster graphics editor. Many emoticon artists design their emoticons pixel by pixel. Some emoticons are made in vector format, such as Scalable Vector Graphics (SVG), and automatically processed using a graphics library. This allows SVG files to be automatically rendered as a GIF or PNG file, which is compatible with most browsers.

Avatars are a computer user's representation of himself/herself or alter ego, whether in the form of a three-dimensional model used in computer games, a two-dimensional icon (picture) used on Internet forums and other communities, or a text construct found on early systems such as MUDs. Essentially an avatar is an "object" representing the embodiment of the user, where the avatar can also refer to the personality connected with the screen name, or handle, of an Internet user. Conventional avatar systems used on most Internet forums comprises a small (e.g., 80×80 to 100×100 pixels) square-shaped area close to the user's forum post, where the avatar is placed in order for other users to easily identify who has written the post without having to read their username. Some forums allow the user to upload an avatar image that may have been designed by the user or acquired from elsewhere. Other forums allow the user to select an avatar from a preset list or use an auto-discovery algorithm to extract one from the user's homepage.

Avatars may also be animated, consisting of a sequence of multiple images played repeatedly. Examples of Avatar systems include Gaia Online™, WeeWorld™, Frenzoo™ or Meez™, where a pixelized representation of a person or creature is used, which can then be customized to the user's wishes. There are also avatar systems (e.g. Trutoon™) where a representation is created using a person's face with customized characters and backgrounds.

In each of the above examples, the visualized communication is very limited in that the multimedia must appear near accompanying text in order to form a coherent message that is longer than one or two words. Also, conventional multimedia communication has inadequate word correlation to adapt and communicate multimedia as a primary form of communication. Furthermore, these conventional systems lack the flexibility to personalize and perform cultural modeling across a wide variety of communication platforms. Thus, there is a need for a multimedia platform for receiving user inputs and automatically associating multimedia visualizations with the user inputs in order to create multimedia messages based upon the user inputs.

SUMMARY OF THE INVENTION

In accordance with various exemplary embodiments, systems and methods are disclosed for allowing users to enter user data, such as text and voice data, in their respective devices and transform the user data into respective visualizations, such as multimedia files, including movie clips. Through this transformation, words, phrases and sentences may be communicated as a series of files that convey the same ideas, concepts contained in the text. In one embodiment, text is transformed into a series of movie clips that are concatenated or streamed to one or more users.

In order to perform the transformation, a unique method of text transformation is implemented to take into account language, culture, and behavioral aspects of user inputs. Sentence restructuring and expansion techniques may be used to parse and extract words and phrases that match or are contextually equivalent to user inputs. Additional phrase matching and classification techniques may be used to expand granularity of the linguistic and semantic analysis necessary for the transformation. The system in accordance with the present invention may optionally perform indexing and tagging of user data and multimedia files in accordance with the aforementioned transformations and utilize an engine to match text in accordance with custom indexing.

BRIEF DESCRIPTION OF THE DRAWINGS

The invention and its particular features and advantages will become more apparent from the following detailed description considered with reference to the accompanying drawing, wherein.

DETAILED DESCRIPTION

The present invention relates to a system and method for receiving user input data, such as text and voice data, and transforming the user input data into visualizations representative of the voice and text data. The input data is used to generate an MMS message that can be sent to virtually any device that is configured to receive MMS messages.

Various methods are disclosed for transforming the user input data into visualizations. As will be discussed in more detail below, these methods may optionally take into account linguistic, semantic, and cultural differences in the user inputs when creating the visualizations.

As used herein, a visualization may refer the multimedia files that are short in duration and designed to portray a concise representation of an idea or concept and may include a specific cultural application. A visualization may also include virtually any image that can be conveyed in an MMS message. The visualization may include various forms of multimedia files, including but not limited to static images, such as still multimedia images, pictures, graphics and the like, as well as dynamic images, such as movie clip, cartoon clips, animations and graphic presentations of stock quotes, sports news, and weather reports and the like.

System Configuration

Figure 6A:
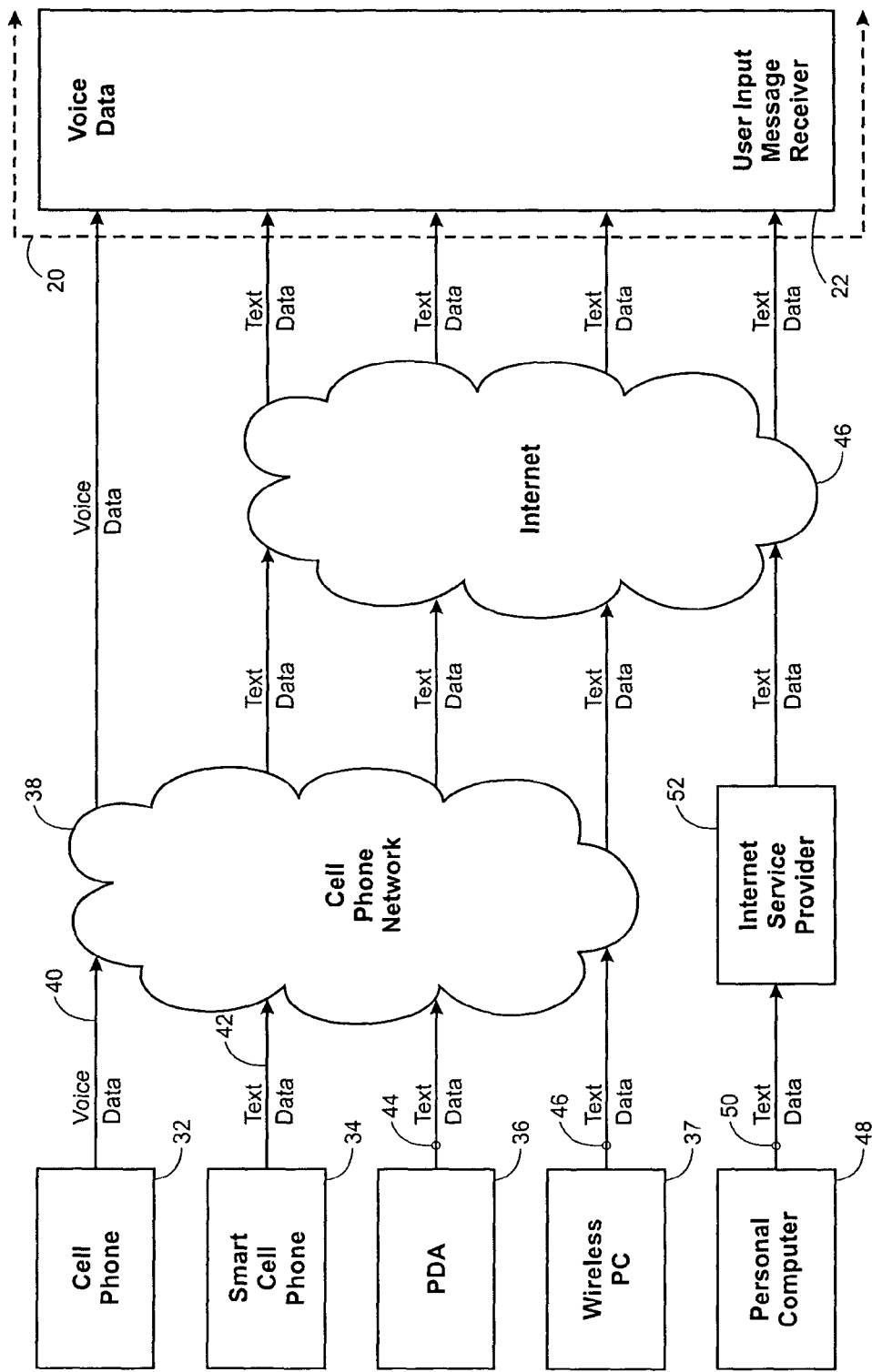
FIGS. 6A and 6B illustrate a block diagram of the invention.
Figure 6B:
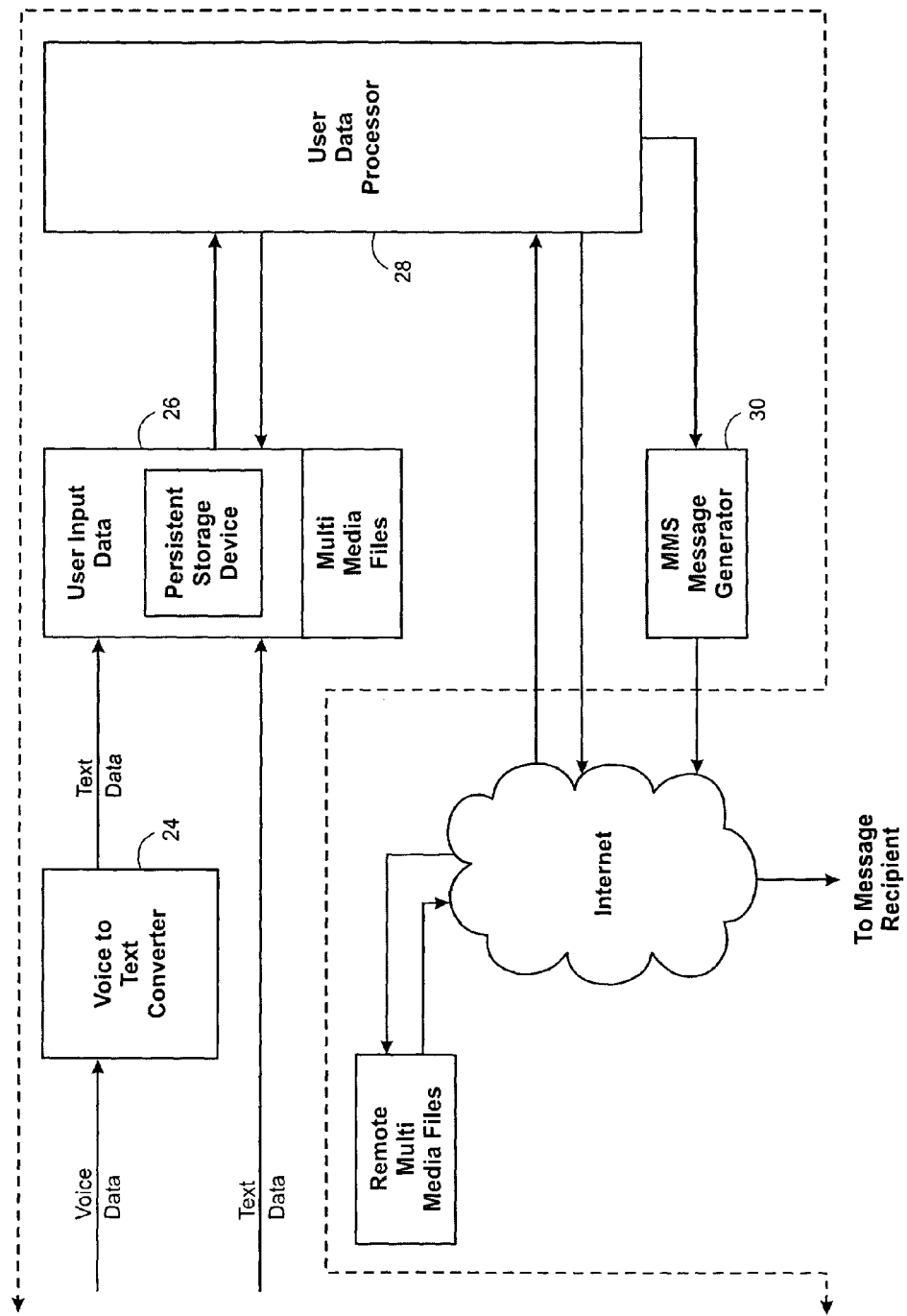

Referring first to FIGS. 6A and 6B, an exemplary embodiment of the invention is illustrated. The system in accordance with the present invention automatically generates MMS messages or other image based messages from user inputs, such as text or voice data, and is shown within the dashed box 20. The system 20 includes a user input message receiver 22, a voice to text converter 24, a persistent storage device 26, a user data processor 28 and an MMS message generator 30. The system 20 may be implemented in a single server or a plurality of servers distributed over a network.

The system 20 is configured to receive user input data from various sources and over various transmission links over various networks, such as a wired or wireless network including, but not limited to, over-the-air (wireless), cable, satellite, telephone, DSL (Direct Subscriber Line), LAN (Local Area Network), WAN (Wide Area Network), Intranet, and/or the Internet Networks.

Several exemplary embodiments are illustrated in FIGS. 6A and 6B. The system 20 includes a User Input Message Receiver 22 for receiving user generated messages. The User Input Message Receiver 22 may be configured as cellular receiver or transceiver for receiving cellular voice and text messages in a manner well known in the art. The User Input Message Receiver 22 may also include a persistent storage device 26 for storing such messages as well as multi-media files, a processor 28 and an MMS message generator 30. MMS message generators are well known in the art. For example, Mbuni Open Source MMS Gateway can support MMS message generation on Linux and MacOs X operating systems, and ActiveXperts SMS and MMS Toolkit can support Windows operating systems.

The system 20 is configured to receive messages from various sources. For example, as shown, a user can transmit voice data from a cellular phone 32 over a wireless link 40 by way of a cellular phone network 38 directly to a User Input Message Receiver 22. In such an application, the user voice data from the cellular phone 32 is received as voice data. This voice data is applied to the voice to text converter 24, which are extremely well known in the art, where it is converted to text data and stored in the persistent storage device 26.

In alternate applications, text data directly from a smart cell phone 34, personal digital assistant (PDA) 36 may be transmitted over the cellular phone network 38 by way of various wireless communication links 42 and 44, respectively, to the Internet, generally identified by the reference number 46, and, in turn, to the User Input Message Receiver 22. The text data from the smart cell phone 34 and the PDA 36 is stored as text data in the persistent storage device 26. Similarly, a personal computer (PC) can also access the system 20 by way of a wireless communication link 46.

The system 20 is also accessible by way of hardwire communication links. For example, a PC 48 can access the system by way of a hardwire communication link 50 that is connected to an Internet Service Provider 52 and, in turn, to the Internet 46. In such an application, text data from the PC 48 is received by the User Input Message Receiver 22 and stored in the persistent storage device 26.

Exemplary Embodiment

Figure 1:
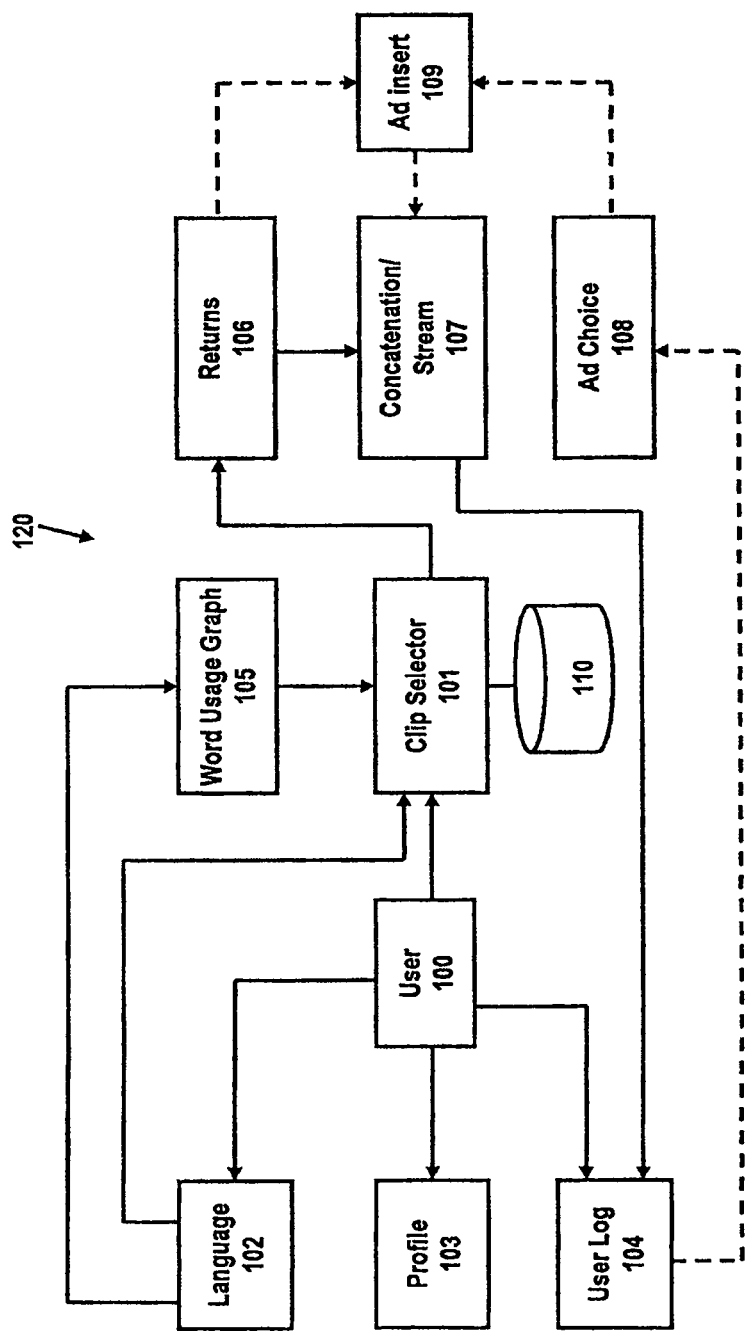
FIG. 1 illustrates an exemplary functional block diagram for use in providing multimedia correlation to textual user inputs.

FIG. 1 illustrates one exemplary embodiment of a system, generally identified with the reference numeral 120, for providing text-to-multimedia correlation and communication of user input data. Even though the system 120 is illustrated and described for applications in which the user 100 sends text data, it will be understood that the system 120 operates in a similar manner when the user input is voice data. The only difference is that the voice data is first converted to text data, as described above.

As mentioned above, the system 120 is configured to enable a User 100 to communicate data by way of various processor-based devices, such as a personal computer 37, 48 (FIG. 6A), cell phone 32, 34, PDA 36, etc. Various techniques may be employed to enable the system 120 (FIG. 1) to identify the user 100 ("personalized information data"). For example, personalized information data, such as a login, password or screen name is used to identify the user. Alternatively, the system 120 can be configured for other forms of identification of the user 100, such as, hard-coded data, such as processor ID, SIM card ID, etc.

The personalized information data may be stored in a profile database 103 either locally in the persistent storage device 26 (FIG. 6A) or remotely at a remote location, such as a server, communicatively coupled to user's device 100 over various networks and communication links, as discussed above.

The profile database 103 is used to store personal information relating to one or more users of the device 100, such as name, age, location, and so on. Additionally, the profile database 103 may be linked to, or incorporated within a user log 104, described in more detail below. An example of personalized information data may include: name, sex, city and state, age, and a cultural group that is user selected as pertaining to them from multiple choice selection.

When a user 100 wishes to send an MMS message to another person, the user 100 (after log-in) enters data, such as text data, into the system 120. The data is forwarded to a language module 102, discussed in more detail below, and the user log 104 for storage and subsequent processing. The language module 102 forms a portion of the user data processor 28 (FIG. 6B) which contains models for language and may contain models for cultural context processing, which allows entries from the user's device 32, 43, 36, 37 (FIG. 6A) to be translated from the same or different languages into images or visualizations for creation of an MMS message based upon the user input data. The language model 102 may optionally be configured to translate between different cultural or idiomatic expressions. An example of a cultural or idiomatic expression is as follows:

"I'm down with that . . . " which means I agree to that, or that works for me.

Other models may also be used to translate user data into visualizations. For example, assuming a user types in word 1 as the message. In response to word 1, the machine, i.e. language model 102 responds with multiple selections to the user for word 1. The user is prompted to pick a selection. Once the user 100 selects visualization, such as a video clip, to simulate word 1, the language module 102 looks at other users of the system 120 that have picked the same visualization for word 1. When the user enters word 2, the user is offered visualizations that have been selected for word 2 by users that used the same visualization for word 1 as the user.

An alternate model may use a weighting system to select a visualization, e.g. movie clip, based on user text input data by a weighting system to select a clip or visualization based on users in the same geographical location ("geolocation"). For example, if the user 1 has not used word 1 before, the clips used by other users of the system may be reviewed and weights assigned to them. For example, if user 2 is in the same geolocation as user 1, and user 1 has selected a clip for word 1, user 2's selection may be assigned a weight of 2.

If user 2 of has in the past selected 3 video clips, for words 2,3 and 4 respectively, and has also made a selection for word 1, and user 1 made the same selections for words 2,3,4 in the past, then give user 2's selection for word 1 a weight of 1. If user 2 has made selections for words 2-10 in the past that are the same as the selection made for words 2-10 by user 1, and has made a selection for word 1, then give user 2's selection for word 1 a weight of 2. Similarly, if 20 clips have been selected by both user 1 and user 2, then assign a weight of 10 to user 2's choice for word 1. Out of all the video clips in the system, pick those with a highest weighting, and show those to user 1 as choices for word 1.

As mentioned above, cultural simulation models may also be incorporated into the translation. More particularly, a cultural simulation model may be used to develop an expression of an agent archetype, and simulate that agent archetype's responses to sources of information reflecting changing conditions of the environment being modeled.

Cultural simulation modeling is disclosed in detail in U.S. Pat. Nos. 7,263,474 and 7,630,874, hereby incorporated by reference. An agent's behavioral expression may be modeled in terms of total vocabulary, groups of words, keywords or phrases likely to be linked to the information sources.

As set forth in detail in U.S. Pat. Nos. 7,263,474 and 7,630,874, hereby incorporated by reference, in order to establish base modeling, a library of agent references and a data push-pull matrix are created. Human expert judgment may be used for data contextualization control in selecting which data elements (e.g., keywords and phrases) are likely to correspond to a specific agent archetype that is modeled. For example, if it is determined that a user is discussing the gulf of Mexico oil crisis by using words or phrases, or speaking to another users who is using such words or phrases, then clips associated with the Mexican oil crisis are chosen for inclusion in the clips offered to the user when they type in "crisis." A set of active situations, such as the Mexican oil crisis, can be established and stored reflecting current topics relevant to a cultural group or in the recent news.

Such expert human judgment may be supplied by experts in human psychology, finance, systems, medicine, politics, linguistics, etc. The results of such human expert judgment in data element extraction are the associative matrix maps (e.g., keyword vocabulary lists), as described in the '474 and '874 patents, corresponding to each of the information sources. The creation and management of the associative matrix maps may be controlled by a "sim space" data interaction controller, as described in the '474 and '874 patents. Basically, the "sim space" data interaction controller looks at the total list of visualizations used by each cultural group. Either by observing the user's visualization choices, or reading user's manual cultural choice selection, the user may be assigned to a culture. In some cases, a single text message is enough to determine a culture. When user uses word 1, the user is offered video clips associated with that culture.

Alternatively, a user can be assigned a culture by examining a visualization previously submitted by that user (user generated content) for a particular word (having that word as its tag), or the user has previously selected the visualization using an "affinity engine", as described below. If the user previously selected that clip for this word before, the system 120 uses the visualization again or offers that clip in a priority position for user selection. Or, if anyone in a particular cultural group submitted user generated content tagged with the word, then, if yes, use this visualization. Or, if anyone in same cultural group selected a visualization for this word, then, if yes, use the visualization.

As discussed in the '474 and '874 patents, associative matrix maps thus generated are used for the encoding of each agent's behavioral expression in terms of its response to input data elements (keywords) that are deemed likely to exert influence on the modeling. Further details regarding the modeling are disclosed in the '474 and '874 patents.

In addition to user demographic information, the user log 104 may also be used to store information regarding the user's previous actions, selections, preferences, etc. Examples of data contained in user log 104 include, but are not limited to, the user's total vocabulary, culture group, timeline(s) of usage, and play list(s) of multimedia clips. The total vocabulary refers to the words previously entered into the system 120 by the user during their history of use of the application 120.

The user log 104 may be customized and personalized to the user's device 100. In particular, each user device will likely have slightly different display characteristics. The type of device and associated device information can be stored in the User Log. In addition, the user log 104 may be customized to keep a running list of words the user has used before and the associated visualizations or movie clips associated with those words. Thus, when a user types a word that he has used before, the default return to the user would be the clip he either uploaded or selected for the word previously.

As mentioned above, the system 120 includes some form of persistent storage device 110, such as the persistent storage device 26 (FIG. 6A), to serve as a repository of a large or distributed database of information. The persistent storage device 110 may be used to store keywords received from the user in order to create a personal word map that is incorporated into the user's profile as the user enters data. Previously personalized word maps may also be retried, or, if there is no stored personal word map, a default (initial) word map may be used.

Optionally, user profiling may also include other processes, preferably implemented as a software application that functions as an "affinity engine", for example, as described in detail in U.S. Pat. No. 6,895,406, hereby incorporated by reference. Such affinity engines serve as a content aware correlation engine, which performs the task of contextual cognition of natural language syntax driven by user inputs. The user inputs may then be used to dynamically generate control cues, which in turn are utilized to organize or influence the delivery of text, numeric, audio, graphical, and data objects, processes, or media entities being provided or transacted in a web portal, interactive media system, or any other suitable network. An example of an affinity engine is as follows: Assume a user subscribes or otherwise is authorized to use the system 120 to create visualizations from text data in order to create MMS messages for transmission to a third party. Once logged in, the system 120 may offer the user a field of words, such as "potato chip, stick, skyscraper, shirt, etc." The user is prompted to select a word, for example, "potato chip." In response, the affinity engine offers multiple visualizations, e.g. video clips for the word "potato chip". The user is then prompted to select one. The user's selection is stored in a database in the persistent storage device 110. This process is repeated for other words, for example, skyscraper and shirt. The affinity engine looks at choices and compares choices to match other users in the database 110 that have made same choices. The User's profile is tagged with the cultural designator most prevalent among users who made the same choices. Thereafter, when the user types in a sentence, the default return of the visualizations or video clips would be clips that had either been uploaded or selected by members of the group carrying the same cultural designator.

In one exemplary embodiment, the affinity engine utilizes the natural language associated with database-stored content, which may include natural language elements stored as metadata to establish proximities of inferred thematic content. Inferred thematic content is determined by looking at the other words in a sentence. For example, if the word "ball" is used in a sentence with the word "dancing" it may mean a party event. If the word "ball" is used in a sentence with "helmet" it refers to a sporting event. Both events are inferred thematic content.

Output control drivers are executed to dynamically formulate a response from the database that may deliver the content to the user in specific orders of associative proximity. More particularly, a network analysis displayed in node form will show words that are linked as if in a thesaurus, words nearly the same; words that are two node links away are less associated and so are second order (for example in MIT's "Wordnet"). Choices for visualization selection can be provided to the user, first for visualizations tagged with words that are directly linked in the thesaurus, and then for visualizations tagged with words two links away.

At the same time, a specifically user unique and constantly updated user profile data set is created. The configuration may operate on an interactive basis to construct a personal profile of the user in relation to available content, while continuously refining the intuitive coupling between user response and content delivery. The associative proximity assessment process improves over repeated iterations of user responses, and thus captures the nuances and subtleties specific to a user's particular history of responses. More details regarding such personalization may be found in U.S. Pat. No. 6,895,406, hereby incorporated by reference.

Turning back to FIG. 1, the language module 102 communicates with a word usage graph module 105, which processes words and/or word patterns used by the user 100, and coordinates word and phrase tagging and selection performed by a clip selector 101. The language module 102 is used to associate English words with visualizations. The language module 102 may also be used with non-English languages, as appropriate. The word usage graph module 105 processes phrases, i.e. groups of words that are commonly used by the user for which one or more visualizations are found in the database 110 that correspond to those phrases. The clip selector 101 offers visualization to the user on a priority basis. For example, a first offering may be provided as a default. If a phrase is found that has an associated visualization or video clip, the clip selector 101 will offer it to user. If the user rejects the default, they then word by word visualization choices are offered to the user, as discussed above.

The word usage graph module 105 may also be utilized to establish preferred methods of parsing and selecting one or more words and phrases entered by the user 100 for subsequent selection. For example, a specific word entered by user 100 can be processed and compared to previous patterns of usage for user 100, which may be obtained from the user log 104, and/or the language module 102. Such a comparison may take precedence over a straightforward iterative comparison of word patterns by themselves.

The clip selector 101 processes and correlates data entries from the user 100, the language model 102 and/or the word usage graph 105, and uses the processed result to locate tagged multimedia visualizations residing in storage 110. Visualizations may be tagged with the words the visualization portrays. Visualizations may also be tagged by the user submitting user generated content or by system 120 third party staff.

The language module 102, user log 104, profile 103 and usage graph 105 may all be combined together with clip selector 101 in one or more servers communicatively coupled to a network. Alternately, individual modules may be separately housed, according to the needs of the network designer.

During operation, the clip selector 101 operates in conjunction with the aforementioned modules to interpret user messages and translate them into visualizations to be as culturally-specific as possible. In one embodiment, the interpretation utilizes the following techniques to process and match user inputs: A set priority of applying techniques may be created as illustrated below.

(1) Sentence restructuring techniques, where sentences may be parsed to detect words and/or phrases linked to user-trained group specific tables. Also, machine-based language translation may be carried out, where parts of speech may be converted and/or reordered based on specific languages used.

(2) Expansion techniques, to process and group words and word equivalents for linking to visualizations. One exemplary expansion technique utilizes WordNet®, which is a large lexical database of language data, where nouns, verbs, adjectives and adverbs are grouped into sets of cognitive synonyms ("synsets"), each expressing a distinct concept. Synsets may be interlinked by means of conceptual-semantic and lexical relations. The resulting network of meaningfully related words and concepts can be navigated with a browser. Other expansion techniques, involve the use of spell-checkers and thesauruses. Also, group-specific tables may be generated to link previous user words (or word equivalents) with selected visualizations.

(3) "Start from" techniques—under basic translation configurations, word/phrase parsing would start from the beginning of a phrase or sentence, and iteratively move through the remainder until an end is reached. However, alternate techniques may be utilized to detect and alter starting points for word/phrase processing. Utilizing tables for users/groups, the popularity of word/phrases may be used to establish a set starting point. Also, various processing algorithms may be set to find a "best start" for a phrase/sentence. The "start from" settings may also be set to randomly establish starting points as well.

(4) Phrase matching techniques may be utilized to match phrases according to popularity, length of phrase (longer phrases being preferred), and uniqueness of phrase. As an example, given key phrase "ABCD", the phrase may be decomposed into key phrases using a predetermined distance (e.g., 1) to produce (AB), (BC), (CD), (AC), and (BD). The key phrase and/or decomposed phrases may then be processed to establish a best match score against phrases in storage 110 (or other numeric order processing techniques), based on criteria such as phrase overlap, fuzziness of phrase (e.g., "aminal" versus "animal"), derivational properties of the phrase, match by synonym or original, compound versus isolated word, and cross-lingual or same-language determinations. For example, the longest phrase used as a media file tag found in the submitted text could be chosen first and the rest of the words filled in after. Or, if multiple overlapping phrases used as tags are found, the maximum use of phrases could be used.

(5) Phrase classification techniques may be used to classify items such as user-trained cultural phrase group(s), recent phrases used by user, and statistically significant phrases. Various morphological analysis techniques and stemming may be used to classify and match phrases, including named entity recognition, multiword lookup, compound resolution, synonym detection and word sense disambiguation.

(6) Completion techniques may be used to present the results and/or match results with visualizations for subsequent presentation to the user. The completion may provide the results in a best-to-worst match unordered, or in a best-to-worst match in occurrence order. Other Boolean constraints may be added to provide results with complete matching (Boolean AND) or partial matches (Boolean OR). Vector-space weighting may also be used to establish sorting keys for matches.

Taking the above techniques into account, under one exemplary embodiment, user inputs are parsed to obtain more literal interpretations for phrase matching:

<start>

(sentence restructuring techniques: (1))+(expansion techniques (2))+(start from techniques (3))+(phrase matching techniques (4))–search against: (phrase classification techniques (5))

<back to start until (completion techniques (6)) until done>

An example using the process discussed above to interpret user input and translate it into a visualization is provided with an exemplary sentence as provided below:

"I'm down with goin to see the rolling Stones tonight."

(1) Sentence restructuring—phrases are detected in sentences (such as in the example above "I'm down with"). If this phrase is found mostly in used by males under 25 years of age, for example, or inner city urban males, then the visualization, e.g. video clip, is selected that has most often been chosen by the cultural group.

(2) Expansion techniques—"I'm down with" is expanded to "I agree to" and also "thumbs up" and "goin" is expanded to "going" in the spell-checker.

(3) Start from techniques—this analysis produces these possible phrases: "goin to see," "see the rolling," and "the rolling Stones".

(4) Phrase matching techniques—To match "the rolling Stones," if no match found for whole phrase, go to "the rolling" and then "Stones," if no match found, go to "the", "rolling," and then "Stones."

(5) Phrase classification techniques—"the rolling Stones" matched to visualizations used by the total user group or the more specifically, the cultural user group for frequency of choice. "The rolling Stones" is recognized as a named entity.

(6) Completion techniques—techniques #3 and #5 above both identified the rolling Stones as the preferred phrase allowing "goin to see" to be included as the prior phrase, with the balance of the words in the sentence ("I'm" and "tonight) to be matched as individual words.

The various techniques may be manipulated to produce a specific type result, based on the technique implemented in (1)-(6). For example, the system may be configured to simply provide a literal translation of phrases, based on an iterative comparison of the longest phrase from a user-trained cultural phrase group. In this example, the sentence restructuring techniques and expansion techniques listed above would be skipped, and the beginning of a phrase may be designated as the "start from" technique. By designating the phrase matching technique to match the longest phrases, the completion technique may be set to fill in a best-to-worst result based on occurrence order. In the alternative, the above example may be modified so that the "start from" designation functions according to popularity; in this manner, the longest phrase would still be matched, but the starting points may be specified by the system designer. Each analytical step offers suggestions. Completion techniques are then applied as in the rolling Stone example above.

In another exemplary embodiment, user inputs may undergo semantic analysis to shift words and/or phrases around to form a new semantic sequence:

<start>

(expansion techniques (2))+(sentence restructuring techniques: (1))+(start from techniques (3))+(phrase matching techniques (4))–search against: (phrase classification techniques (5))

<back to start until (completion techniques (6)) until done>

Here the expansion techniques are processed first, followed by sentence restructuring to initiate semantic analysis of the sentence. The remaining techniques would be customized similar to the previous example to establish a specific result, depending on the needs of the designer. In this regard, the following lists for the techniques described above are provided in a preferred order of use:

Sentence restructuring techniques: (1) skip; (2) user-trained group specific tables, (3) translation, and (4) convert parts of speech and the reorder based on other languages;

Expansion techniques: (1) skip, (2) WordNet®, (3) spell checker, (4) thesaurus, and (5) group-specific table;

"Start-from" techniques: (1) popularity, (2) beginning, (3) find best start, and (4) random;

Phrase-matching techniques: (1) popularity, (2) longest, and (3) unique;

Phrase classification techniques: (1) user-trained cultural phrase group, (2) recent phrases used, and (3) statistically significant phrases; and Completion techniques: (1) fill in from best-to-worst match unordered, and (2) fill in from best-to-worst in occurrence order.

As one skilled in the art would readily recognize, the aforementioned preferences are not limited to those specifically listed; other techniques may be added or substituted as needed. The sequence of techniques affects the end result. Such considerations can be part of the cultural processing configurations for optimum path.

Figure 1A:
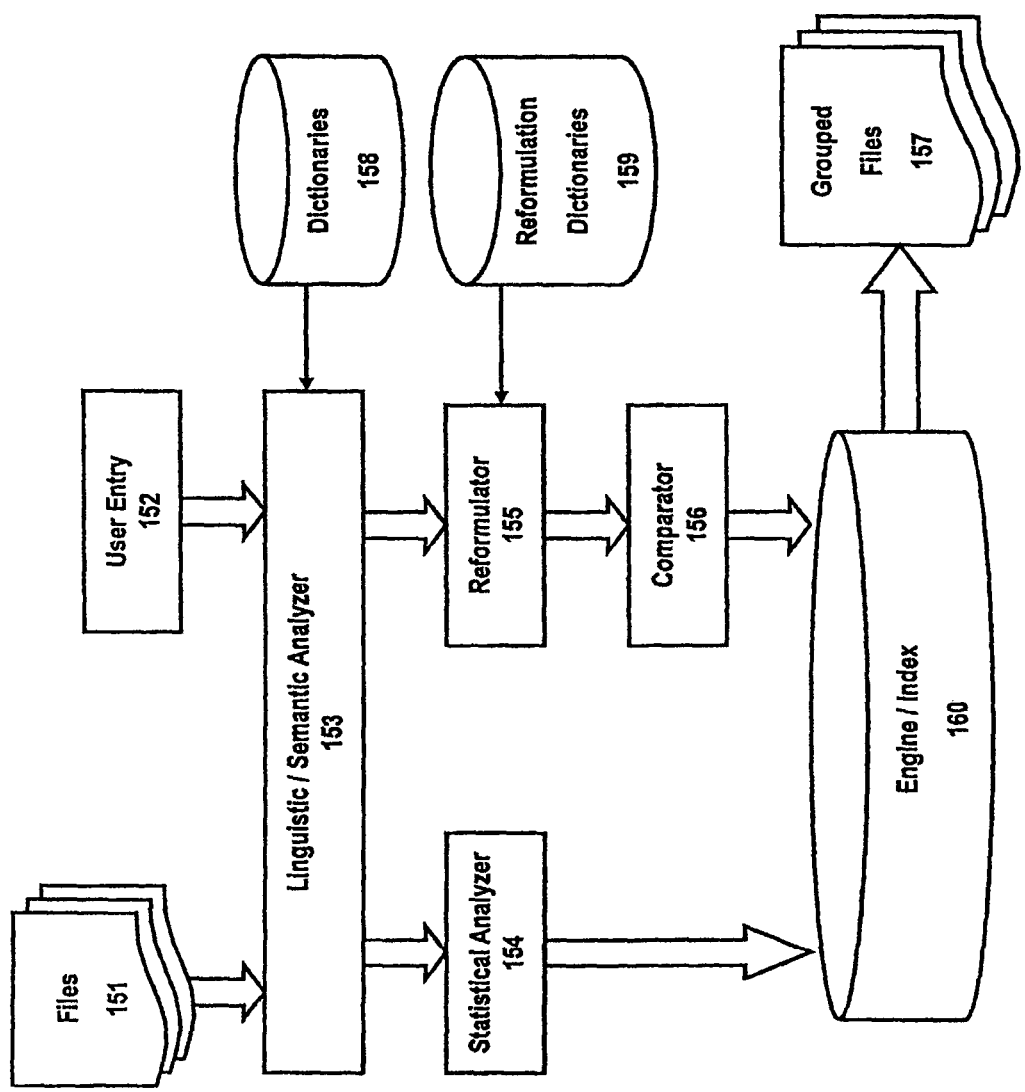
FIG. 1A illustrates an exemplary sub-system for the embodiment of FIG. 1 for analyzing user entries for indexing, searching and grouping tagged files.

Turning to FIG. 1A, an exemplary system configuration is illustrated for performing tasks mentioned above in relation to user input translations and phrase matching. User entries 152 are forwarded to linguistic/semantic analyzer 153 used to determine what language the person is speaking. Also, files 151 containing tag information (or other similar data, including text data) are provided to the linguistic/semantic analyzer 153. The linguistic/semantic analyzer 153 serves as the basis for cross-lingual and/or cross-cultural processing and interpretation. The linguistic/semantic analyzer 153 is communicatively coupled to a dictionary database 158, which preferably houses multiple dictionaries including a full-form dictionary that contains possible part-of-speech tags, linguistic features (e.g., gender, number, etc.) and other information. Entries in dictionary database 158 are preferably normalized and have linguistic properties associated with them, like lemma and category. The full-form dictionary should also be configured to find all the normalized entries corresponding to surface words found in entered text. Thus, when an entered word is found in the dictionary, the system may have access to its possible normalizations (nouns or adjective singular, masculine, in a nominative or genitive case). The resulting translated matches are fed to the user as options to select. User selection improves both the next selection to the user and also increments the optimum path through the dictionary. As a result the dictionary will improve with repeated use. By including phrases in the dictionary, idioms will emerge.

Various processing models may be used in analyzer 153 to interpret text and/or data. For example, character strings may be split into simple words, taking into account context and linguistic rules, to produce accurate segmentation. A morphological analyzer may be utilized to search words in a dictionary to associate each found word with its lemma and all morpho-syntactic tags. For example, a morphological analyzer may be used to analyze the proper noun Wichita as it is used in sentence. It is recognized as a proper noun, therefore its thesaurus permutations are not used to select visualizations. If there are no Wichita tagged visualizations, other visualizations from the Kansas geolocation are presented for selection.

If a word or abbreviation is not found, it may be given a default set of morpho-syntactic tags based on its typography. For example, a word beginning with an uppercase letter may be tagged as a proper noun. Additionally, idiomatic expression analyzers may be used to detect idiomatic expressions and consider them as single words for the rest of the processing. The detection of idiomatic expressions is preferably performed by applying a set of rules that are triggered on specific words and tested on left and right contexts of the trigger.

The linguistic/semantic analyzer 153 may also be configured to provide part-of-speech tagging for user entries 152 and the files 151. The analysis involves assigning to a word its disambiguated part of speech in the sentential context in which the word is used. Out of context, many words may be ambiguous in their part of speech. For example, the word "train" can feature as a noun or a verb. However, when the word appears in the context of other words, the ambiguity is often reduced (e.g., in context, the usage reciting "riding on a train" indicates that "train" can only be a noun). Positional morpho-syntactic tags may also be used so that that the tag itself distinguishes which words can appear before or after another word. The part-of-speech tag preferably searches valid paths through all the possible tag paths using attested trigram and bigram sequences from associated matrices.

Syntactic analysis may also be incorporated into analyzer 153 to reveal syntactic structure of an analyzed sentence using a set of syntactic rules. For example, analyzer 153 may split a sentence into nominal and verbal strings and recognize dependency relations (such as those within compounds). "Empty word" analysis may also be performed to identify words that should not be used as search criteria and preferably eliminating them.

Data files 151 that have gone through the linguistic/semantic analyzer 153 may also be forwarded to a statistical analyzer 154 for statistical processing. The statistical analyzer 154 is counting, for example, popularity of word usage in general and by particular groups. It can count the usage of a particular word or phrase in a specific timeframe, e.g. the day, the week, month.

Another function of statistical analyzer 154 is to compare intersections between user entries and tagged files (151), even if they may contain different words/phrases. The statistical model is used to give the user a ranked list of files according to their relevance. Any suitable model may be used, depending on the needs of the designer, such as a vector space model or a weighted Boolean model. Once the statistical processing is completed, the result is forwarded and stored to engine/index database 160.

For user entries 152 processed in linguistic/semantic analyzer 153, the entries may be forwarded to a reformulator 155 for expansion. In some cases, the linguistic/semantic processing and comparisons may not be sufficient to establish a link between the user entry and a relevant file. In such cases, it may be necessary to add a lexical semantic knowledge (e.g., from reformulation dictionaries 159 to a specified field in order to help engine/index 160 to produce all possible formulations of relevant matches. The expansion is used to infer from the original entry other words expressing the same concepts. The expansion can be in the same language (synonyms, hyponyms, etc.), or in a different language (multilingual reformulation).

As illustrated in FIG. 1A, a comparator 156 evaluates all possible intersections between user entries and files, and computes relevant weights, cultural accuracy, user preferences, (or other calculations) for each intersection and forwards the result to engine/index 160. The engine/index 160 processes data to extract informative linguistic elements from text parts. The text parts refer to the words in the user input. The processing includes part-of-speech tagging of words, their lemmatization and the extraction of compounds and named entities. Lemmatization refers to conjugations from root word or lemma, for example, run, runs, running. For each language, engine/index 160 retrieves for each term the files containing the term. A concept profile may be associated with each file, where each component of the profile indicates a presence or absence of a user entry concept in the file (a concept may be present in a file if at least one of the reformulated terms is present). A concept profile refers to a list of tags.

Retrieved files sharing the same concept profiles are clustered together. This clustering allows for a straightforward merging strategy that takes into account the originally entered concepts and the way they have been reformulated. Since the concepts are in the original query language, the concept profiles associated with the clusters formed for different target languages are comparable since they may be linked to the original language concepts, and even the clusters from different languages or cultural contexts having the same profile are simply merged. Once documents are indexed and searched, engine/index 160 outputs matched files 157 for presentation. The engine/index 160 includes a total collection of all the tags, visualizations, users, sentences and phrases in the database; all structured data ready for processing.

Referring briefly back to FIG. 1, once language processing is performed in one or more of language module 102, user log 104 and word usage graph 105, the clip selector 101 matches user entries with tagged visualizations residing in storage 110. The visualizations may also tagged in order to be matched against words and/or phrases entered by users during communication. By stringing multiple matched visualizations, users may effectively communicate sentences as a series of multimedia clips conveying the same concepts or ideas. They are tagged with words that express what is happening in the video clip. For example, a video clip showing a person jumping may be tagged with jump, jumps, jumped, etc, and maybe leap, leaps if it looks good, and if a clown is jumping, it would also be tagged with clown. There is subjectivity in the tagging because either the users submitting the visualizations or the people managing the database are responsible for tagging. However, many anticipated multimedia clips are 1-3 seconds long, so the choices in tagging are easily made.

Figure 1B:
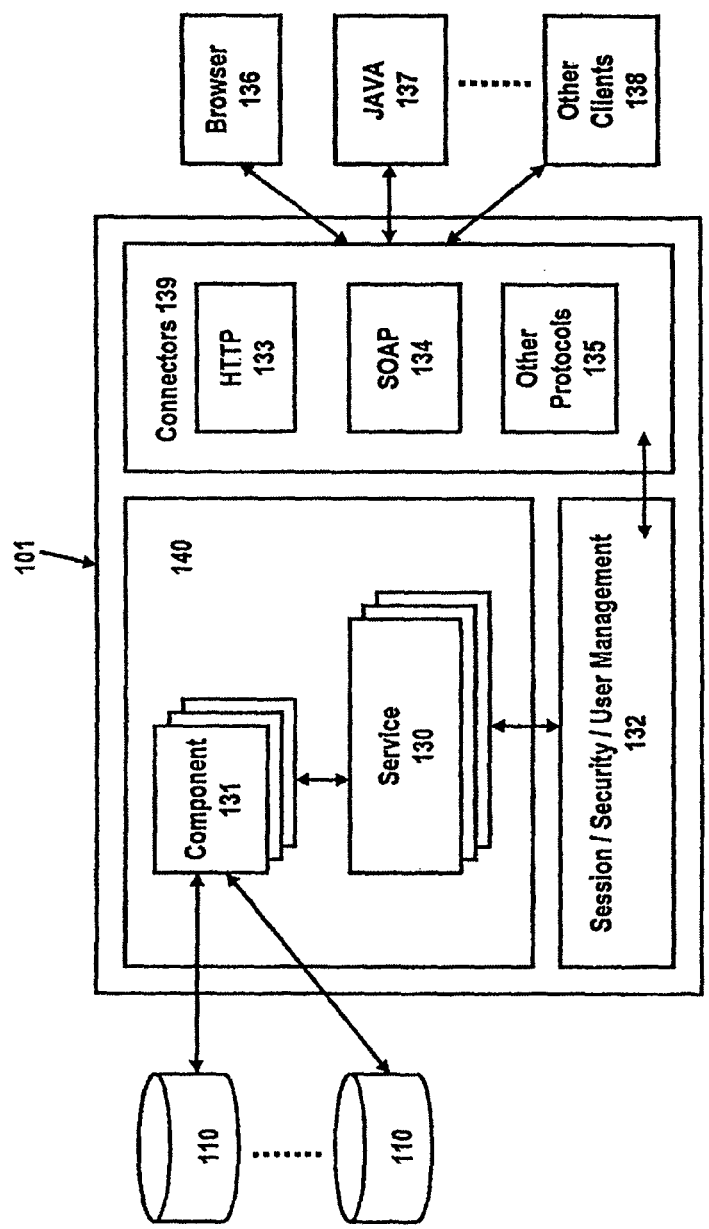
FIG. 1B illustrates another exemplary sub-system for the embodiment of FIG. 1 for interfacing software modules, users, and other clients to system services.

FIG. 1B illustrates an exemplary embodiment for tagging and interfacing visualizations with users and other modules in system 120. As mentioned previously, as user text input processing is completed, matched results are related to visualizations that are "tagged" with specific words and/or phrases, for example, as discussed above. As is known in the art, tagging is a process of annotating or assigning data (e.g., metadata) to information. In one aspect, tagging can be strictly defined as a free-text keyword, where the tagging produces an indexing process for assigning tags to resources, such as multimedia. In another aspect, a shared collection of tags used within a system may be correlated as "collaborative tagging", or folksonomy. In such systems, users may freely assign tags to specific resources with the purpose of referencing those resources later on with the help of the assigned tags. The tags may reference the resource as a whole, but may also reference only specific parts of the resource. For certain multimedia data, content may be identified and annotated using nonstandard tagging methods, or standard tagging methods including MPEG-7 metadata, or other XML-based markup language for the description and annotation of multimedia data.

Turning to FIG. 1B, an exemplary configuration is provided through which clip selector 101 retrieves visualizations in accordance with the user input processing described above. The platform for clip selector 101 may be implemented as a middleware platform set up as a platform-independent Java implementation (Java API) to provide server functionality. The connectors 139 realize the server side for client-server communications using a particular protocol. In an exemplary embodiment, connector implementations utilize HTTP 133 via Simple Object Access Protocol (SOAP) 134, or other protocols 135. For each connector, a client is preferably implemented for easier access to services within applications. User access may be implemented using any of a variety of client including browser 136, Java 137, and/or other clients 138.

The clip selector components 131 are preferably embodied as an element that may encapsulate functionality 140 for common tasks shared by services 130 or other components. One exemplary task includes accessing multimedia database 110. Services 130 defines the functionality of clip selector 101 offered to users 101. Each specific service may define public methods that can be remotely invoked by clients through one of the connectors 139. Access to services 130 is preferably controlled on a server side by an internal session/security/user-management 132 that may be based on users, groups and/or roles, where a role may define a collection of service methods that a user owning this role may access.

Services may also act as agents and may also be considered users that may access services. Access rights may be defined on different levels of granularity, such as per-service, per-service method or per-method signature. When an internal session is started, service methods may be invoked remotely by using the invocation facilities of the connector client in use. Additional techniques for interfacing services may be found in U.S. Pat. Nos. 7,263,474 and 6,895,406, referenced above and incorporated by reference in their entirety herein. Additionally, autonomous data handlers may be used to interface system resources to each other and to clients; examples of such data handlers are disclosed in U.S. Pat. No. 6,282,697, titled "Computer Processing and Programming Method Using Autonomous Data Handlers", issued Aug. 28, 2001, and U.S. Pat. No. 7,127,701, titled "Computer Processing and Programming Method Using Autonomous Data Handlers, issued Oct. 24, 2006, both of which are incorporated by reference in their entirety herein.

Figure 2A:
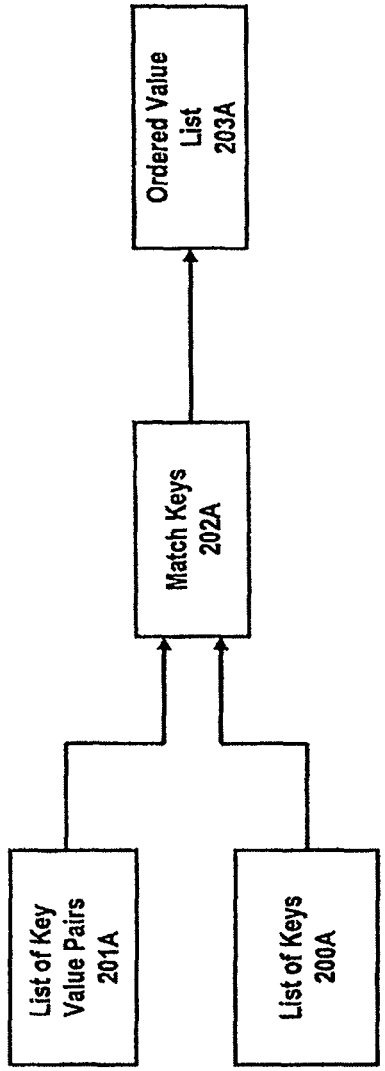
FIG. 2A illustrates an exemplary configuration for generating an ordered value list of multimedia according to matches of keys.

Turning to FIG. 2A, an exemplary matching process that takes advantage of the aforementioned systems and related processes is disclosed. As user entries are received, tagged words and/or phrases (keys) are organized according to key value pairs (201A). Accordingly, tagged words and/or phrases are associated with related or matching tags belonging to specific files. The key value pairs 201A are then processed to match keys 202a stored in a list of keys database 200A. Once matches are found, an ordered value list 203A is produced. More particularly, the ordered value list presents the visualizations to the user in the same order as the corresponding words (or phrases) that the user presented to the system 120.

Figure 2B:
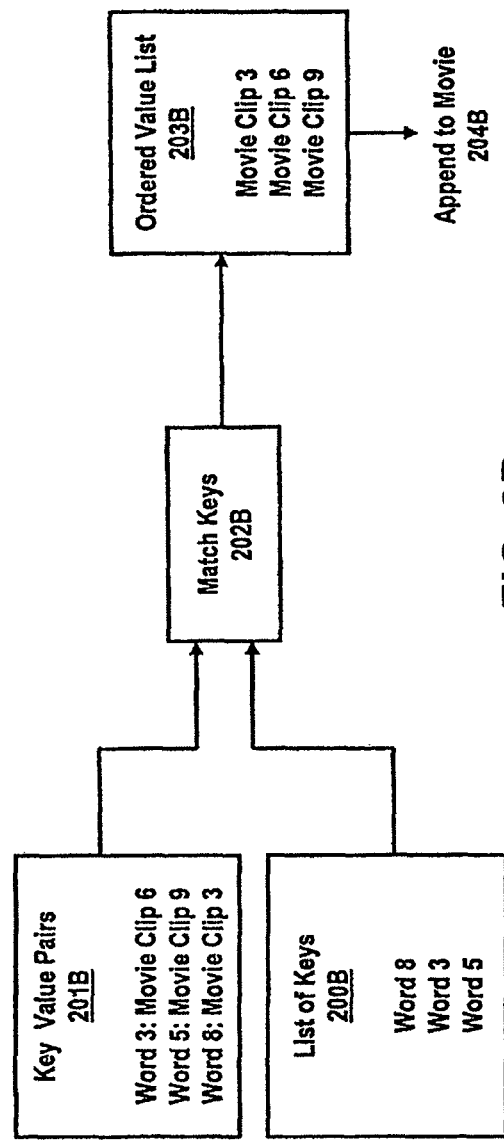
FIG. 2B illustrates a more detailed exemplary configuration for generating an ordered value list of multimedia according to matches of keys.

FIG. 2B provides a more detailed description of the embodiment illustrated in FIG. 2A, where user words are processed to determine matching visualizations. In the example of FIG. 2B, a user entry comprises a plurality or words, where specific words (word 3, word 5 and word 8) are associated (201B) with related movie clips (movie clip 6, movie clip 9, and movie clip 3, respectively). A list of keys (200B: word, 8, word 3, word 5) are provided for match key processing (202B), where the keys also designate a preferred order of presentation. As the keys are matched and processed in 202B, and an ordered value list 203B is produced where the movie clip order (movie clip 3, movie clip 6, movie clip 9) corresponds to the list of keys provided in 200B. Once the ordered value list is generated, the clips may be appended to a movie (or individually streamed in order) in 304B.

Figure 3:
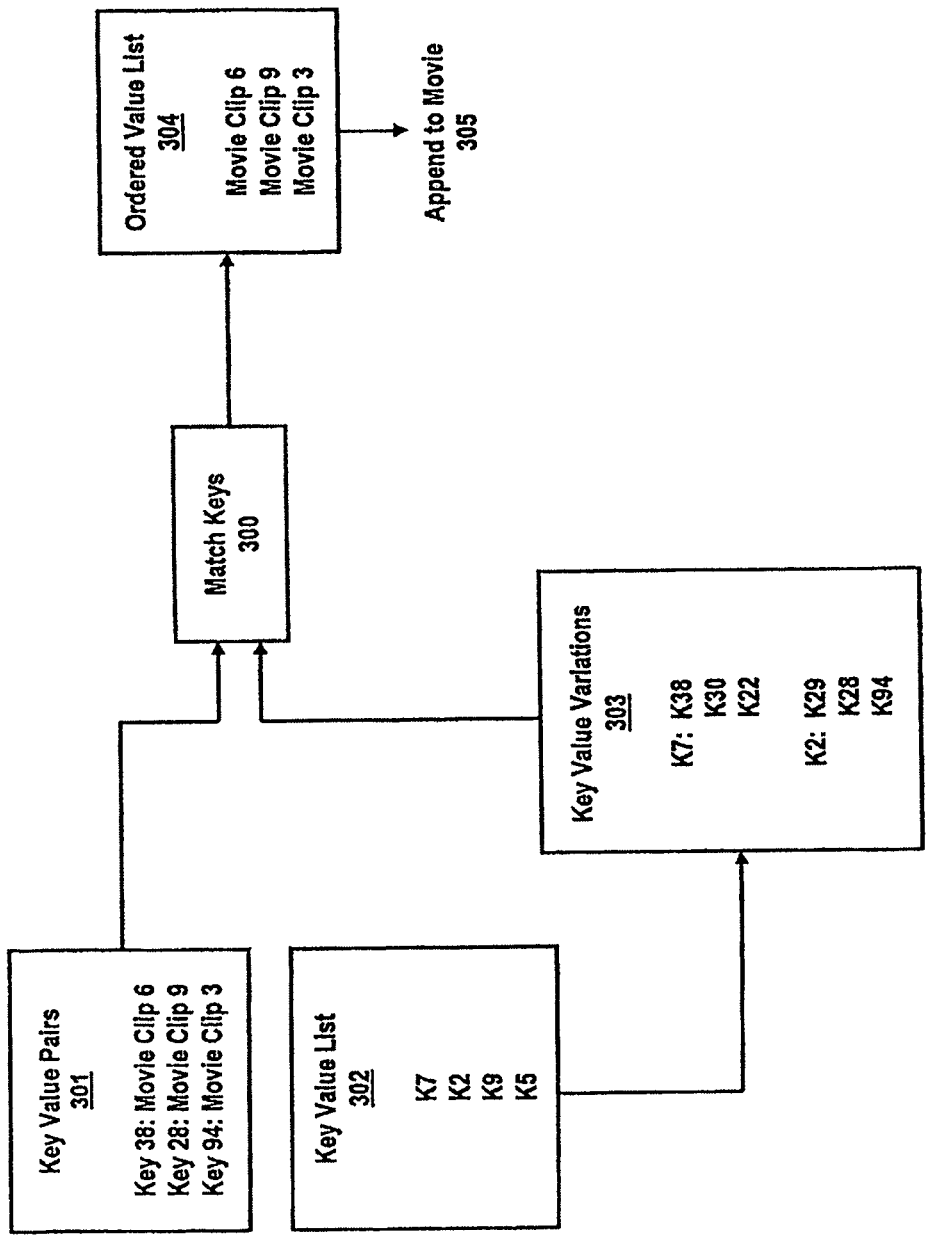
FIG. 3 illustrates an exemplary embodiment where an ordered value list is generated using key value variations.

FIG. 3 illustrates an alternate embodiment, where key value variations are taken into account during processing. Just as in FIG. 2B, key value pairs (301) are generated, where specific keys (key 38, key 28, key 94) are associated with specific movie clips (movie clip 6, movie clip 9, movie clip 3, respectively). For the key value list 302 (K7, K2, K9, K5), various clips may be associated with a particular key. As shown in FIG. 3, key value variations 303 list multiple key variations (K38, K30, K22; K29, K28, K94) associated with a particular key (K7 and K2, respectively). As the keys are matched (300), an ordered value list 304 is generated and appended to movie 305.

Figure 4:
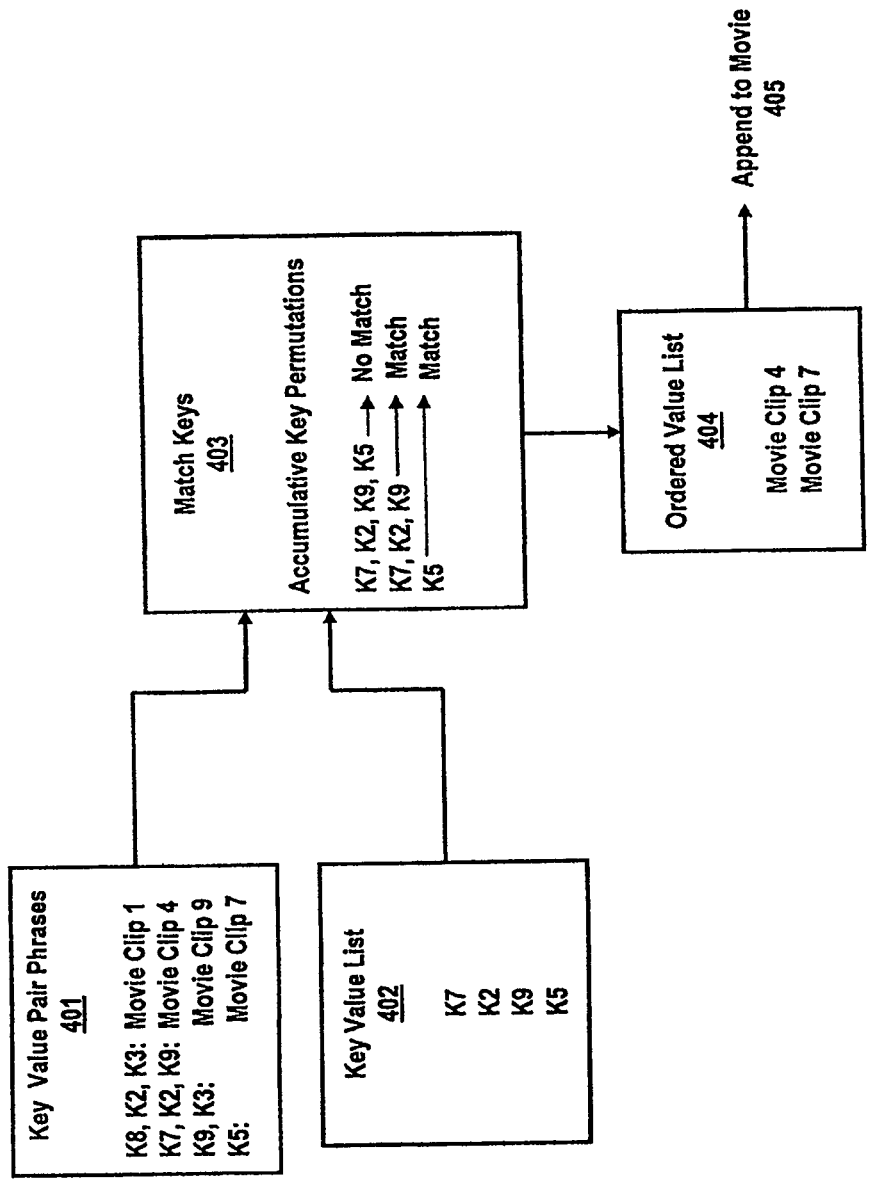
FIG. 4 illustrates an exemplary embodiment where an ordered value list is generated using accumulated key permutations.

FIG. 4 illustrates yet another embodiment where accumulative key permutations are taken into account during processing. Here, key value pair phrases are received, where multiple keys may be associated with a specific movie clip (401). In the example, movie clips 1 and 4 have three associated keys (K8, K2, K3, and K7, K2, K9, respectively), movie clip 9 has two associated keys (K9, K3) and movie clip 7 has only one associated key (K5). As the key value list 402 is received, the keys are matched to the key value pair phrases in 403. As is shown in FIG. 4, various phrases may be entered by a user comprising various keys. If a first phrase (K7, K2, K9, K5) does not completely match a key value pair phrase, then a "no match" result is issued. If another phrase is entered (K7, K2, K9) and matches a key value pair phrase, then a "match" is issued, and the associated movie clip (movie clip 4) is called. Once the processing is complete, an ordered value list 404 is generated and appended to movie 405.

Figure 5:
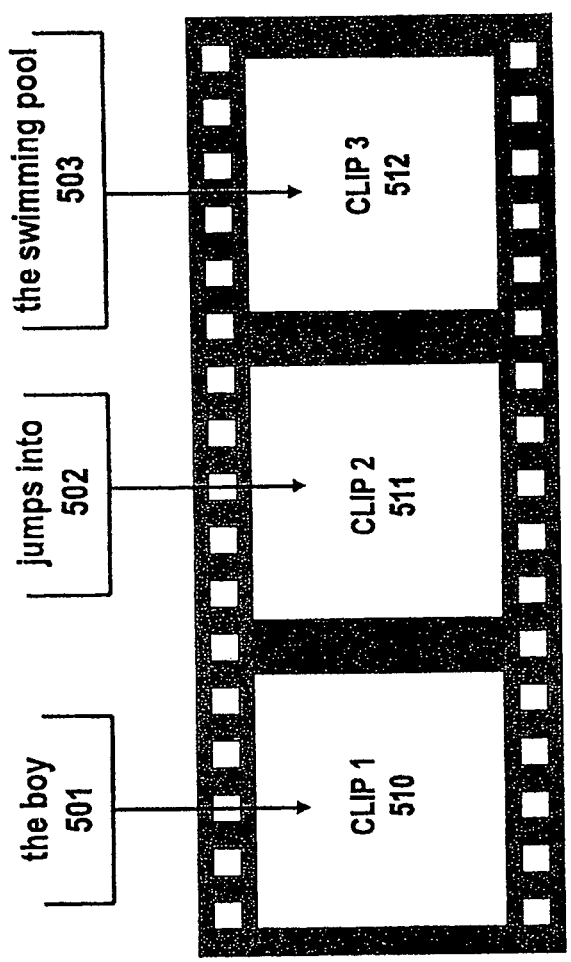
FIG. 5 illustrates an example of a movie clip correlated from a textual input.

FIG. 5 illustrates an example of how tagged words and movie clips are presented using the key matching techniques described above. As a user enters the sentence "the boy jumps into the swimming pool", the linguistic/semantic processing breaks the sentence down into parsed phrases: "the boy" (501), "jumps into" (502), "the swimming pool" (503). Utilizing simplified key matching, such as that described in FIG. 2A, each key affiliated with each phrase tag is matched to a respective movie clip (clip 1, clip 2, clip 3) and is appended to a movie (510, 511, 512) that communicates the sentence in the form of visualizations. As mentioned above, the movie clips may be concatenated into a movie and sent to a player, or the individual clips may be streamed to a player, depending on the configuration desired. Referring back to FIG. 1, movie clips returned (106) from clip selector 101 are processed in concatenation/stream module 107, and forwarded to the user via user log 104. Alternately, the instruction set to recreate the movie can transmit or save, as needed. The instruction set may be a basic instruction, or may also include sub-selections as well. Such a configuration allows the message to be compressed during transmission, and/or sent as a link with the instruction set encoded (or not). This provides a means for generating the displayed message to the final user without having to remember the sender specifics.

Still referring to FIG. 1, an alternate embodiment is disclosed for monetizing visualization selections within system 120. Based on entries in user log 104, an ad choice module 108 is provided to process tags and to generate relevant advertisements that would be forwarded to ad insert module 109. The ad choice module 108 picks the ad to be given to the user. Various methods may be used to provide an ad selection. For example, the ad selection may be based on a word match with one of the user's input data, or the user's culture, or the advertiser has proved economic incentive to show the ad to as many as possible, or time or day and geographical appropriateness, etc. The determinations or ad choice may be both economic and cultural.

As movie clips are returned (106) from clip selector 101, they are routed through ad insert module 109, which inserts advertisements or adjunct material such as training aids that are incorporated into concatenation/stream module 107 for deliver to user 100. The ad insert module 109 is an automated video editor. The ad insert module 107 fetches movie clips and puts them into the stream. The ad choice module 107 may append the ad to the front or back of the set of movie clips in the final return to the user (the video "sentence"), or may insert the ad in the midst of the video sentence, if the tags on the ad match the tags required at that spot in the sentence. The ad insert module 107 inserts the movie clips in the same order as the original sentence typed in by the user.

Although the invention has been described with reference to particular arrangements and embodiments of services, systems, processors, devices, features, modules and the like, these are not intended to exhaust all possible arrangements or embodiments, and indeed many other modifications and variations will be ascertainable to those of skill in the art. For example, while the linguistic and semantic analysis was described above in relation to languages and culture, the same applications may be configured to handle medical or other scientific terminology. With respect to such applications, medical dictionaries, terms, phrases and reformulations may be carried out where tags and keys are associated with related visualizations, where the tags may possess associative qualities relating to their medical and/or scientific similarities.

Also, while specific communication protocols are mentioned in this document, one skilled in the art would appreciate that other protocols may be used or substituted. This application covers any adaptations or variations of the present invention. Therefore, the present invention is limited only by the claims and all available equivalents.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A computerized method for creating a multimedia file from user input data, the method comprising:
   receiving user input data representative of text and voice data in a user input receiver;
   storing said user input data and other data which includes visualization data and advertising inserts in a persistent storage device;
   processing said user input data in order to associate said user input data with one or more visualizations by way of a computer under program control representative of the meaning of said user input data; and
   generating a multimedia file from said one or more visualizations and at least one of said advertising inserts by way of a computer under program control that conveys the meaning of said user input data, wherein said generating step includes the step of automatically selecting one or both of said advertising insert and said one or more visualizations.

2. The computerized method as recited in claim 1, wherein said generating step comprises:
   generating a multimedia file in which said one or more visualizations are presented in the same order as said user input data is received.

3. The computerized method as recited in claim 1, wherein said receiving step comprises:
   receiving text data.

4. The computerized method as recited in claim 3, wherein said receiving step comprises:
   receiving one or more words of text data.

5. The computerized method as recited in claim 3, wherein said receiving step comprises:
   receiving one or more phrases of text data.

6. The computerized method as recited in claim 3, wherein said receiving step comprises:
  receiving one or more sentences of text data.

7. The computerized method as recited in claim 1, wherein said receiving step comprises:
  receiving voice data; wherein the method further includes the step of:
  converting said voice data to text data.

8. The method as recited in claim 1, further including the step of:
  transmitting said multimedia file to a device that is configured to receive a multimedia file.

9. The method as recited in claim 1, wherein said user input data is associated with multiple visualizations and wherein the method further includes the step of:
  automatically concatenating said visualizations together.

10. A computerized method for creating multimedia files from user input data, the method comprising:
  receiving user input data representative of text and voice data in a user input receiver;
  storing user input data and other data which includes visualization data and advertising inserts in a persistent storage device;
  processing said user input data and comparing said user input with said other data by way of a computer under program control;
  associating said user input data with one or more visualizations which represent the meaning of said user input data based upon said comparison of said user input data with said other data by way of said computer under program control, and
  generating a multimedia file from said one or more visualizations and at least one of said advertising inserts under program control which conveys the meaning of said user input data, wherein said generating step includes the step of automatically selecting one or both of said advertising insert and said one or more visualizations.

11. The computerized method as recited in claim 10, wherein said storing step comprises:
  storing user input data and other data, wherein said other data includes past user word usage.

12. The computerized method as recited in claim 10, wherein said storing step comprises:
  storing user input data and other data, wherein said other data includes previous visualizations selected by said user.

13. The computerized method as recited in claim 10, wherein said storing step comprises:
  storing user input data and other data, wherein said other data includes the cultural data.

14. The computerized method as recited in claim 13, wherein said storing step comprises:
  storing user input data and other data in a persistent storage device, wherein said user input data includes data regarding the cultural group to which the user belongs.

15. The computerized method as recited in claim 14, wherein said storing step comprises:
  storing user input data and other data in a persistent storage device, wherein said user input data includes data regarding the cultural group to which the user belongs and said cultural group data is user selected.

16. The computerized method as recited in claim 10, wherein said storing step comprises:
  storing user input data includes data relating to the user's location, wherein said other data includes the data regarding associations of other users in the same general location.

17. The computerized method as recited in claim 10, further including the steps of:
  presenting one or more visualizations in response to input data words input by the user; and
  storing visualizations selected by the user and the associated input data words forming selected key value pairs; wherein said associating step comprises:
  associating user input data with one or more visualizations based upon said comparison of said user input data with said other data under program control, wherein said other data includes said selected key value pairs.

18. The computerized method as recited in claim 17, further including the step of:
  analyzing said key value pairs in order to determine a cultural group for said user.

19. The computerized method as recited in claim 10, wherein said storing step comprises:
  storing user input data and other data, wherein said other data includes default data.

20. The computerized method as recited in claim 17, further including the step of:
  storing said key value pairs selected by a user as a part of a user profile.

21. The computerized method as recited in claim 10, further including the step of:
  storing all visualizations and associated input data as a part of a user profile forming a user vocabulary.

22. The computerized method as recited in claim 10, wherein said storing step comprises:
  storing user input data and other data, wherein said other data includes default visualizations associated with unknown input data.

23. The computerized method as recited in claim 10, wherein said storing step comprises:
  storing user input data and other data, wherein said other data includes the context of the user input data.

24. The computerized method as recited in claim 10, wherein said selecting step comprises:
  automatically selecting an advertising insert based upon historic word use.

25. The computerized method as recited in claim 10, wherein said selecting step comprises:
  automatically selecting an advertising insert based upon cultural data.

26. The computerized method as recited in claim 10, wherein said storing step comprises:
  storing user input data and other data, wherein said other data includes other words used in the message stream.

27. The computerized method as recited in claim 10, wherein said storing step comprises:
  storing user input data and other data, wherein said other data includes other words used by that culture.

28. A messaging system comprising:
  a user input message receiver for receiving user input data representative of text and voice data from at least one user input source;
  a persistent storage device for storing said user input data and other data which includes a visualization data and advertising inserts;
  a data processor which evaluates said user input data and associates said user input data with one or more visualizations and generates a multimedia file from said one or more visualizations and at least one of said advertising inserts under program control which conveys the meaning of said user input data; wherein said generating step includes the step of automatically selecting one or both of said advertising insert and said visualizations and a message generator for transmitting said multimedia file to a message recipient.

29. The messaging system as recited in claim 28, wherein said multimedia file is generated so that said one or more visualizations are presented in the same order as said user input data is received.

30. The messaging system as recited in claim 28, wherein user data processor generates multiple visualizations for at least one word of user input data for selection by the user.

31. The messaging system as recited in claim 30, wherein said user data processor analyzes the cultural context of said user input data by comparing the user input data with stored data from other users in selecting the visualizations to present to the user.

32. The messaging system as recited in claim 30, wherein said user data processor stores user input data with corresponding selected visualizations in said persistent storage device.

33. The messaging system as recited in claim 32, wherein said user data processor develops a cultural model by grouping users that select the same visualization for the same input word.

34. The messaging system as recited in claim 33, wherein said user data processor compares said user input data with said cultural model to provide visualizations corresponding to said user input data for selection by said user which correspond to said cultural model.

* * * * *